US011290339B2

(12) United States Patent
Cudak et al.

(10) Patent No.: US 11,290,339 B2
(45) Date of Patent: Mar. 29, 2022

(54) ESTIMATING PHYSICAL DISPARITY FOR DATA LOCALITY IN SOFTWARE-DEFINED INFRASTRUCTURES

(71) Applicant: LENOVO ENTERPRISE SOLUTIONS (SINGAPORE) PTE. LTD., Singapore (SG)

(72) Inventors: Gary D. Cudak, Wake Forest, NC (US); Ronald F. Ridgeway, Jr., Holly Springs, NC (US); John M. Petersen, Wake Forest, NC (US); Alexander V. Verrigni, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 79 days.

(21) Appl. No.: 16/916,579

(22) Filed: Jun. 30, 2020

(65) Prior Publication Data
US 2021/0409278 A1  Dec. 30, 2021

(51) Int. Cl.
| H04L 12/24 | (2006.01) |
| H04L 41/12 | (2022.01) |
| H01B 13/34 | (2006.01) |
| H04L 45/64 | (2022.01) |
| H04L 101/622 | (2022.01) |
| G06F 15/173 | (2006.01) |
| H04L 67/1095 | (2022.01) |

(52) U.S. Cl.
CPC ............ *H04L 41/12* (2013.01); *H01B 13/34* (2013.01); *H04L 45/64* (2013.01); *H04L 61/6022* (2013.01); *H04L 67/1095* (2013.01)

(58) Field of Classification Search
CPC ...................................................... H04L 41/12
USPC .................................. 370/254; 709/223, 224
See application file for complete search history.

(56) References Cited

U.S. PATENT DOCUMENTS

| 7,949,489 | B2* | 5/2011 | Cagno ...................... G01B 7/02 |
| | | | 702/158 |
| 2003/0055932 | A1* | 3/2003 | Brisse ................. H04L 67/1097 |
| | | | 709/223 |
| 2009/0282283 | A1* | 11/2009 | Sakakura ............ G06F 11/2033 |
| | | | 714/4.1 |
| 2012/0209988 | A1* | 8/2012 | Pagan ..................... H04L 67/18 |
| | | | 709/224 |
| 2016/0119427 | A1* | 4/2016 | Rao ..................... H04L 67/1097 |
| | | | 709/223 |
| 2018/0026851 | A1* | 1/2018 | Adiletta ................ G06F 13/409 |
| | | | 709/222 |
| 2018/0103110 | A1* | 4/2018 | Koren ..................... H04L 41/12 |
| 2020/0184784 | A1* | 6/2020 | Sainath ..................... G08B 5/22 |

* cited by examiner

*Primary Examiner* — Hee Soo Kim (57) ABSTRACT

Methods, apparatuses, and computer program products for estimating physical disparity for data locality in software-defined infrastructures are disclosed. For each node in a cluster of nodes connected to a switch, vital product data (VPD) of a cable connecting the node to the switch is obtained, and for each cable, a length of the cable is determined from the VPD. A management application assigns a group identifier to each node in the cluster based on the length of the cable connecting the node to the switch. The management application selects a node in the cluster for storing a data set in dependence upon the group identifier of the node.

20 Claims, 8 Drawing Sheets

FIG. 3 obtain, for each node in a cluster of nodes connected to a switch, vital product data (VPD) of a cable connecting the node to the switch 410 determine, for each cable, a length of the cable from the VPD 420 assign, by a management application, a group identifier to each node in the cluster based on the length of the cable connecting the node to the switch 430 select, by the management application, a node in the cluster for storing a data set in dependence upon the group identifier of the node 440

FIG. 4

```
┌─────────────────────────────────────────────────────────────────────┐
│ obtain, for each node in a cluster of nodes connected to a switch,  │
│ vital product data (VPD) of a cable connecting the node to the      │
│ switch 410                                                           │
│                                                                      │
│   ┌───────────────────────────────────────────────────────────┐     │
│   │ capture the VPD from the cable by an instance of an       │     │
│   │ operating system on the node 510                          │     │
│   └───────────────────────────────────────────────────────────┘     │
└─────────────────────────────────────────────────────────────────────┘
                                    │
                                    ▼
┌─────────────────────────────────────────────────────────────────────┐
│ determine, for each cable, a length of the cable from the VPD 420   │
└─────────────────────────────────────────────────────────────────────┘
                                    │
                                    ▼
┌─────────────────────────────────────────────────────────────────────┐
│ assign, by a management application, a group identifier to each    │
│ node in the cluster based on the length of the cable connecting    │
│ the node to the switch 430                                          │
└─────────────────────────────────────────────────────────────────────┘
                                    │
                                    ▼
┌─────────────────────────────────────────────────────────────────────┐
│ select, by the management application, a node in the cluster for   │
│ storing a data set in dependence upon the group identifier of      │
│ the node 440                                                        │
└─────────────────────────────────────────────────────────────────────┘
```

FIG. 5 obtain, for each node in a cluster of nodes connected to a switch, vital product data (VPD) of a cable connecting the node to the switch 410 capture the VPD from the cable by requesting, by the management application, VPD of a plurality of cables from the switch and correlate the VPD of each cable to a node based on a media access control (MAC) address of the node 610 determine, for each cable, a length of the cable from the VPD 420 assign, by a management application, a group identifier to each node in the cluster based on the length of the cable connecting the node to the switch 430 select, by the management application, a node in the cluster for storing a data set in dependence upon the group identifier of the node 440

FIG. 6

```
┌─────────────────────────────────────────────────────────────────────────┐
│ obtain, for each node in a cluster of nodes connected to a switch, vital│
│ product data (VPD) of a cable connecting the node to the switch 410     │
└─────────────────────────────────────────────────────────────────────────┘
                                    │
                                    ▼
┌─────────────────────────────────────────────────────────────────────────┐
│      determine, for each cable, a length of the cable from the VPD 420  │
└─────────────────────────────────────────────────────────────────────────┘
                                    │
                                    ▼
┌─────────────────────────────────────────────────────────────────────────┐
│ assign, by a management application, a group identifier to each node in │
│ the cluster based on the length of the cable connecting the node to the │
│ switch 430                                                              │
│   ┌─────────────────────────────────────────────────────────────────┐   │
│   │ assign the same group identifier to nodes that are connected to │   │
│   │ the switch by a common length of cable 710                      │   │
│   └─────────────────────────────────────────────────────────────────┘   │
└─────────────────────────────────────────────────────────────────────────┘
                                    │
                                    ▼
┌─────────────────────────────────────────────────────────────────────────┐
│ select, by the management application, a node in the cluster for storing│
│ a data set in dependence upon the group identifier of the node 440      │
└─────────────────────────────────────────────────────────────────────────┘
```

FIG. 7

```
┌─────────────────────────────────────────────────────────────────────┐
│ obtain, for each node in a cluster of nodes connected to a switch,  │
│ vital product data (VPD) of a cable connecting the node to the      │
│ switch 410                                                           │
└─────────────────────────────────────────────────────────────────────┘
                                    │
                                    ▼
┌─────────────────────────────────────────────────────────────────────┐
│ determine, for each cable, a length of the cable from the VPD 420   │
└─────────────────────────────────────────────────────────────────────┘
                                    │
                                    ▼
┌─────────────────────────────────────────────────────────────────────┐
│ assign, by a management application, a group identifier to each     │
│ node in the cluster based on the length of the cable connecting     │
│ the node to the switch 430                                           │
└─────────────────────────────────────────────────────────────────────┘
                                    │
                                    ▼
┌─────────────────────────────────────────────────────────────────────┐
│ select, by the management application, a node in the cluster for    │
│ storing a data set in dependence upon the group identifier of the   │
│ node 440                                                             │
│ ┌─────────────────────────────────────────────────────────────────┐ │
│ │ select a first node to store the data set and designating a     │ │
│ │ second node to store a replica of the data set, wherein the     │ │
│ │ first node and the second node have different group             │ │
│ │ identifiers 810                                                  │ │
│ └─────────────────────────────────────────────────────────────────┘ │
└─────────────────────────────────────────────────────────────────────┘
```

FIG. 8

ESTIMATING PHYSICAL DISPARITY FOR DATA LOCALITY IN SOFTWARE-DEFINED INFRASTRUCTURES

BACKGROUND

Field of the Invention

The field of the invention is data processing, or, more specifically, methods, apparatus, and products for estimating physical disparity for data locality in software-defined infrastructures.

Description of Related Art

Software-defined infrastructure (SDI) solves common and pervasive information technology (IT) issues, one of which is data availability and locality. These complex systems typically have multiple racks, often with one or more switches and nodes connecting across multiple racks in a data center. To make decisions about the distribution of data and data availability, an SDI should maintain an awareness of physical location of the nodes and common infrastructure. For example, the use of a common switch by a cluster of nodes may provide a general locality characteristic for those nodes, in that they share a switch and are physically located in proximity to the switch. However, it is advantageous to provide a more granular view of node locality in order to maintain high availability of data stored across a cluster of nodes, and to mitigate the effect of a failure of resources shared by a collection of nodes.

SUMMARY

An embodiment in accordance with the present invention is directed to a method of estimating physical disparity for data locality in software-defined infrastructures, including obtaining, for each node in a cluster of nodes connected to a switch, vital product data (VPD) of a cable connecting the node to the switch, determining, for each cable, a length of the cable from the VPD, assigning, by a management application, a group identifier to each node in the cluster based on the length of the cable connecting the node to the switch, and selecting, by the management application, a node in the cluster for storing a data set in dependence upon the group identifier of the node.

Another embodiment in accordance with the present invention is directed to an apparatus for estimating physical disparity for data locality in software-defined infrastructures, the apparatus comprising a computer processor, a computer memory operatively coupled to the computer processor, the computer memory having disposed within it computer program instructions that, when executed by the computer processor, cause the apparatus to carry out the steps of obtaining, for each node in a cluster of nodes connected to a switch, VPD of a cable connecting the node to the switch, determining, for each cable, a length of the cable from the VPD, assigning, by a management application, a group identifier to each node in the cluster based on the length of the cable connecting the node to the switch, and selecting, by the management application, a node in the cluster for storing a data set in dependence upon the group identifier of the node.

Yet another embodiment in accordance with the present invention is directed to a computer program product for estimating physical disparity for data locality in software-defined infrastructures, the computer program product disposed upon a computer readable medium, the computer program product comprising computer program instructions that, when executed, cause a computer to carry out the steps of obtaining, for each node in a cluster of nodes connected to a switch, VPD of a cable connecting the node to the switch, determining, for each cable, a length of the cable from the VPD, assigning, by a management application, a group identifier to each node in the cluster based on the length of the cable connecting the node to the switch, and selecting, by the management application, a node in the cluster for storing a data set in dependence upon the group identifier of the node.

In various embodiments, obtaining, for each node in the cluster of nodes connected to the switch, the VPD of the cable connecting the node to the switch may include capturing the VPD from the cable by an instance of an operating system on the node. In other embodiments, obtaining, for each node in the cluster of nodes connected to the switch, VPD of a cable connecting the node to the switch may include capturing the VPD from the cable by requesting, by the management application, VPD of a plurality of cables from the switch and correlating the VPD of each cable to a node based on a media access control (MAC) address of the node.

In various embodiments, determining, for each cable, the length of the cable from the VPD includes parsing the VPD to determine the length of the cable. Assigning, by the management application, the group identifier to each node in the cluster based on the length of the cable connecting the node to the switch may include assigning the same group identifier to nodes that are connected to the switch by a common length of cable. Selecting, by the management application, a node in the cluster for storing a data set in dependence upon the group identifier of the node may include selecting a first node to store the data set and designating a second node to store a replica of the data set, wherein the first node and the second node have different group identifiers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
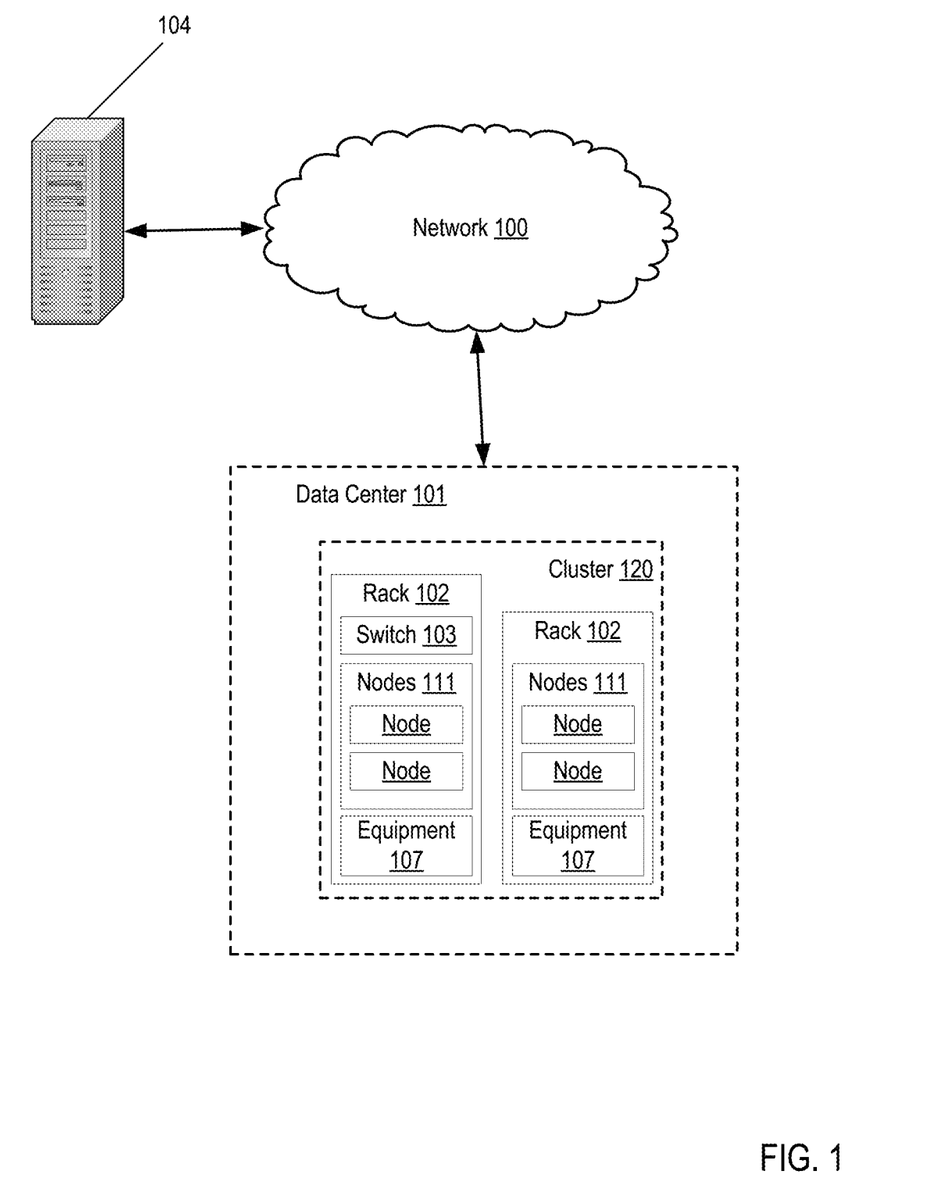
FIG. 1 sets forth a network diagram of a system configured for estimating physical disparity for data locality in software-defined infrastructures according to embodiments of the present invention.

Exemplary methods, apparatus, and products for estimating physical disparity for data locality in software-defined infrastructures in accordance with the present invention are described with reference to the accompanying drawings, beginning with FIG. 1. FIG. 1 sets forth a network diagram of a system configured for estimating physical disparity for data locality in software-defined infrastructures according to embodiments of the present invention. The system of FIG. 1 includes a data center (101) and a management server (104) for administering the data center (101).

The data center (101) is a physical facility or collection of physical facilities used to house computing hardware, storage devices, connectivity infrastructure, telecommunications components, and other hardware for providing computing resources to an organization. Hardware resources in a data center are typically organized in racks (102) of nodes (111) and other equipment (107). Each node (111) may contain processors (217), memory (213), and local storage (215) such as solid state disks (SSDs) and hard disk drives (HDDs), as well as software (214) such as an operating system or virtual machine for providing access to node resources, particularly storage resources (see FIG. 2). For example, a node (111) may be a server. A cluster (105) of nodes in a datacenter delivers a unified pool of storage and presents resources for seamless data availability. The rack also includes other equipment such as universal power supplies (UPSs), power distribution points, routers, patch panels, cooling systems, fans, and switches.

Data flow to nodes (111) is managed by one or more switches (103). For example, the switch (103) may be a rack mounted top of rack (TOR) switch or end of row (EOR) switch. When the switch is a TOR switch, the switch (103) may be mounted in the rack (102) containing nodes (111) that are serviced by the switch (103). A switch (103) may also serve nodes that are distributed across multiple racks (102), in that a switch that is physically located in one rack may serve nodes in a cluster (105) of nodes that are physical located in different racks. The switch (103) may assign a port or a sequence of ports to each node for routing data traffic to that node. For example, a port number or sequence of port numbers may be correlated to the media access control (MAC) address of the node.

Nodes (111) are connected to the switch (103) via a cable (not shown). For example, the cable may be a direct attached cable (DAC) with a transceiver at each end for connecting to the node and the switch. The cables are provided in standard lengths, such as 1 meter (m), 2 m, 3 m, and 5 m. The transceiver contains vital product data (VPD) that includes the length of the cable as well as other information such as the type of cable (fiber optic, copper, coaxial, twisted pair, etc.), manufacturer, model number, serial number, and the like.

The arrangement of servers, nodes, switches, and other devices making up the exemplary system illustrated in FIG. 1 are for explanation, not for limitation. Data processing systems useful according to various embodiments of the present invention may include additional servers, routers, and other devices not shown in FIG. 1, as will occur to those of skill in the art. Networks in such data processing systems may support many data communications protocols and standards, including for example TCP (Transmission Control Protocol), IP (Internet Protocol), UDP (User Datagram Protocol), Ethernet, and others as will occur to those of skill in the art. Various embodiments of the present invention may be implemented on a variety of hardware platforms in addition to those illustrated in FIG. 1.

In managing data stored on the nodes, it is important to define a locality characteristic for a data set in order to maintain awareness of how data is distributed among nodes. For example, in a data redundancy scheme that creates backup replicas of data, it may be unwise to store the replica data set on the same node as the original data set because a failure of the node would make both the original data set and the replica data set unavailable. Similarly, it may be unwise to the replica data set on another node that also shares a particular resource, such as a power distribution unit.

To manage the distribution and location of data stored in the cluster, a software-defined infrastructure (SDI) may be implemented. SDI software is an application that defines the technical requirements for hardware that is to be provisioned to it with no operator or human intervention. The SDI software operates independent of any hardware-specific dependencies. SDI software, such as an infrastructure management application, manages application data and replicas that are distributed across multiple nodes in a data center. The infrastructure management application may apply a data redundancy scheme to distribute data, replica and metadata storage across nodes so that, in the event of a node failure or degradation of service, redundant data may be accessed in from another active node.

Some implementations necessitate an explicit definition of physical locality to the infrastructure management application for it to make decisions regarding replica or metadata storage. This is true not only for locality but for node grouping. A group of nodes may share resources (e.g. power distribution and cooling resources) such that an interruption of those resources may present a single point of failure for the group of nodes. While a common switch shared by the nodes can assist in defining a grouping, the switch does not provide commonality of infrastructure or location disparity characteristics for ensuring data availability.

In accordance with the present invention, an infrastructure management application (126) (see FIG. 2) defines node groupings based on a commonality of VPD obtained from the cables connecting the nodes to the switch. For example, node groupings may be defined based on a commonality in the length of the cables that connect the nodes to the switch. The physical location of a node in the rack may be estimated based on the length of the cable attaching the node to the switch. Based on the estimated physical location, it can be inferred that a group of nodes might share common resources such as power distribution or cooling resources. Thus, to avoid an interruption in data availability due to a single point of failure in common resources, the infrastructure management application (126) in accordance with embodiments of the present invention distributes replica data sets and metadata across nodes that are in different groupings. Thus, a service interruption affecting the data availability of a data set stored on a node belonging to one group might not interfere with the data availability of a replica data set stored on a node belonging to a different group.

Estimating physical disparity for data locality in software-defined infrastructures in accordance with the present invention is generally implemented with computers, that is, with automated computing machinery. In the system of FIG. 1, for example, all the management server (104), nodes (111), and switch (103) are implemented to some extent at least as computers. For further explanation, therefore, FIG. 2 sets forth a block diagram of automated computing machinery comprising an exemplary computer (152) configured for estimating physical disparity for data locality in software-defined infrastructures according to embodiments of the present invention. The computer (152) of FIG. 2 includes at least one computer processor (156) or 'CPU' as well as random access memory (168) (RAM') which is connected through a high speed memory bus (166) and bus adapter (158) to processor (156) and to other components of the computer (152).

Stored in RAM (168) is an infrastructure management application (126), a module of computer program instructions improved for estimating physical disparity for data locality in software-defined infrastructures according to embodiments of the present invention. Also stored in RAM (168) is an operating system (154). Operating systems useful in computers configured for estimating physical disparity for data locality in software-defined infrastructures according to embodiments of the present invention include UNIX™, Linux™, Microsoft XP™, AIX™, IBM's i5/OS™, and others as will occur to those of skill in the art. The operating system (154) and the infrastructure management application (126) in the example of FIG. 2 are shown in RAM (168), but many components of such software typically are stored in non-volatile memory also, such as, for example, on a disk drive (170).

Figure 2:
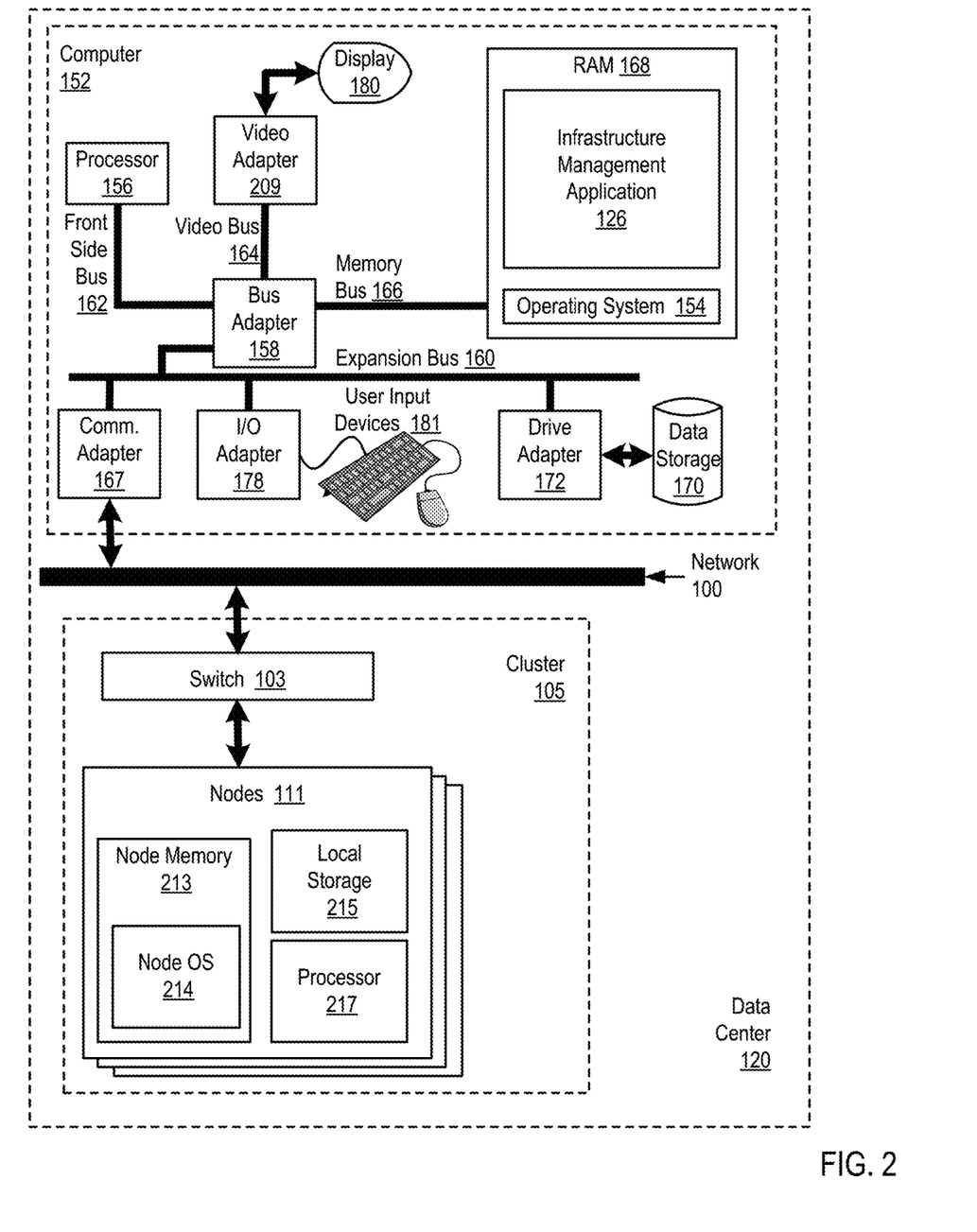
FIG. 2 sets forth a block diagram of an exemplary computer configured for estimating physical disparity for data locality in software-defined infrastructures according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for estimating physical disparity for data locality in software-defined infrastructures according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for estimating physical disparity for data locality in software-defined infrastructures according to embodiments of the present invention include modems for wired dial-up communications, Ethernet (IEEE 802.3) adapters for wired data communications, and 802.11 adapters for wireless data communications.

The exemplary computer (152) is communicatively coupled over the network (100) to the cluster (105) of nodes (111) in the data center (120) via the switch (103). Each node (111) may be configured similarly to the exemplary computer (152), but in particular each node (111) includes a processor (217), memory (213), an instance of a node operating system (OS) (214), and local storage (215). The local storage (215) may include SSDs and HDDs. In various embodiments in accordance with the present invention, the nodes (111) may include servers, network attached storage (NAS), storage area network (SAN) devices, and other such devices that will be recognized by those of skill in the art.

Network (100) may include a variety of techniques including direct local area network (LAN) connections, wide area network (WAN) connections such as the Internet, a router, storage area network (SAN), Ethernet, and others. Network (100) may comprise one or more LANs, WANs, or SANs. Networks (100) further include TCP/IP hardware and/or software, router, repeaters, switches, grids, and/or others. Protocols such as Fibre Channel, Fibre Channel over Ethernet (FCoE), iSCSI, and so forth may be used in network (100). The switch (203) may utilize a protocol associated with the network (100). The switch (103) may be a TCP/IP switch.

The cluster (105) may be implemented with a variety of data communications fabrics, devices, and protocols for connecting the nodes (111) and one or more switches (103). Example fabrics for such a cluster may include Ethernet, Fibre Channel, Infiniband, Serial Attached Small Computer System Interface (SAS), and the like. Example data communications protocols for use in such a cluster (105) may include Advanced Technology Attachment (ATA), Fibre Channel Protocol, SCSI, iSCSI, HyperSCSI, and others.

Figure 3:
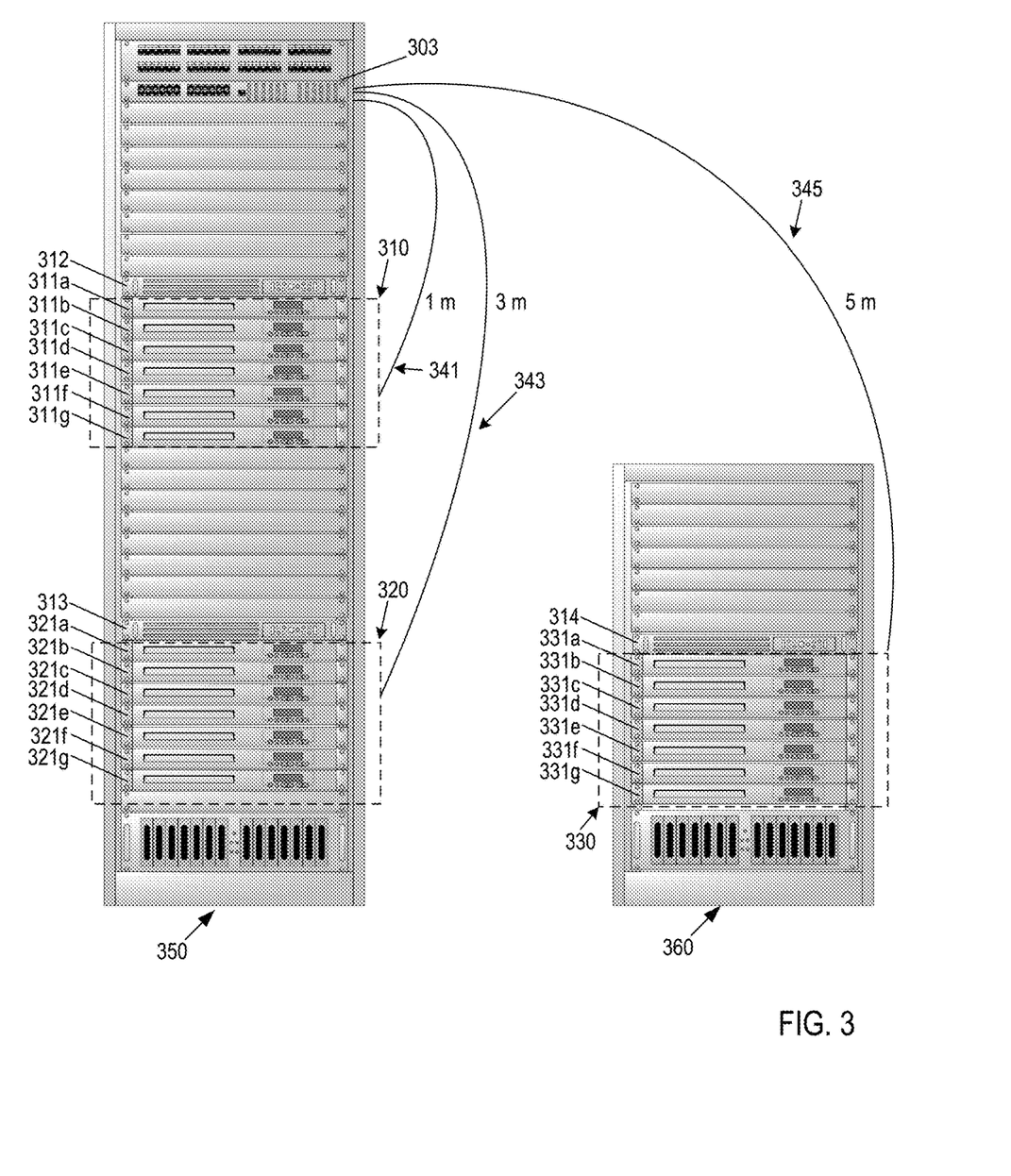
FIG. 3 sets forth a diagram of a system configured for estimating physical disparity for data locality in software-defined infrastructures according to embodiments of the present invention.

For further explanation, FIG. 3 sets forth a diagram of an exemplary system (300) for estimating physical disparity for data locality in software-defined infrastructures according to embodiments of the present invention that includes a grouping assignment for a cluster (105) of nodes (111) that are physically located in racks (350, 360) in a data center. In the example system (300) of FIG. 3, the infrastructure management application (126) uses VPD of cables attaching nodes (111) to the switch (303) to organize the nodes into logical groupings (310, 320, 330). For example, each node (311*a-g*) in the node grouping (310) are connected the switch (303) by a respective cable in a group (341) of 1 m cables. Similarly, nodes (321*a-g*) in the node grouping (320) are connected the switch (303) by a respective cable in a group (343) of 3 m cables. Similarly, nodes (331*a-g*) in the node grouping (330) are connected the switch (303) by a respective cable in a group (345) of 5 m cables. The logical groupings (310, 320, 330) based on the cable length of the nodes in the groupings provides the infrastructure management application with an estimated disparity of the locations of the nodes among the racks (350, 360). Based on the lengths of the cables connecting the nodes to the switch, the infrastructure management application (126) may estimate that nodes connected by a common cable length share a resource is a potential single point of failure.

In the example of FIG. 3, the nodes in node grouping (310) may share a common power distribution point (312) that could be a single point of failure for all nodes in the node grouping (310), in that a failure in the power distribution point (312) would cause a failure in all nodes serviced by the power distribution point (312). Similarly, the nodes in node grouping (320) may share a common power distribution point (313) that could be a single point of failure for all nodes in the node grouping (320), in that a failure in the power distribution point (313) would cause a failure in all nodes serviced by the power distribution point (313). Similarly, the nodes in node grouping (330) may share a common power distribution point (314) that could be a single point of failure for all nodes in the node grouping (330) in that a failure in the power distribution point (314) would cause a failure in all nodes serviced by the power distribution point (314). It will be appreciated by those of skill in the art that other types of devices and systems may represent a single point of failure for multiple nodes.

In the system of FIG. 3, an infrastructure management application (126) may implement a data distribution scheme using the estimated physical disparity of nodes as represented by the logical groupings (310, 320, 330). For example, an original data set may be stored on nodes (311a) of the first grouping (310). For data redundancy, nodes are selected from the second grouping (320) and the third grouping (330) for storing replicas of the data set and metadata, and nodes are not selected from the first grouping (310). The estimated physical disparity of the node groupings used in applying the data redundancy scheme mitigates against a single point of failure affecting data availability for a data set and all its replicas.

Figure 4:
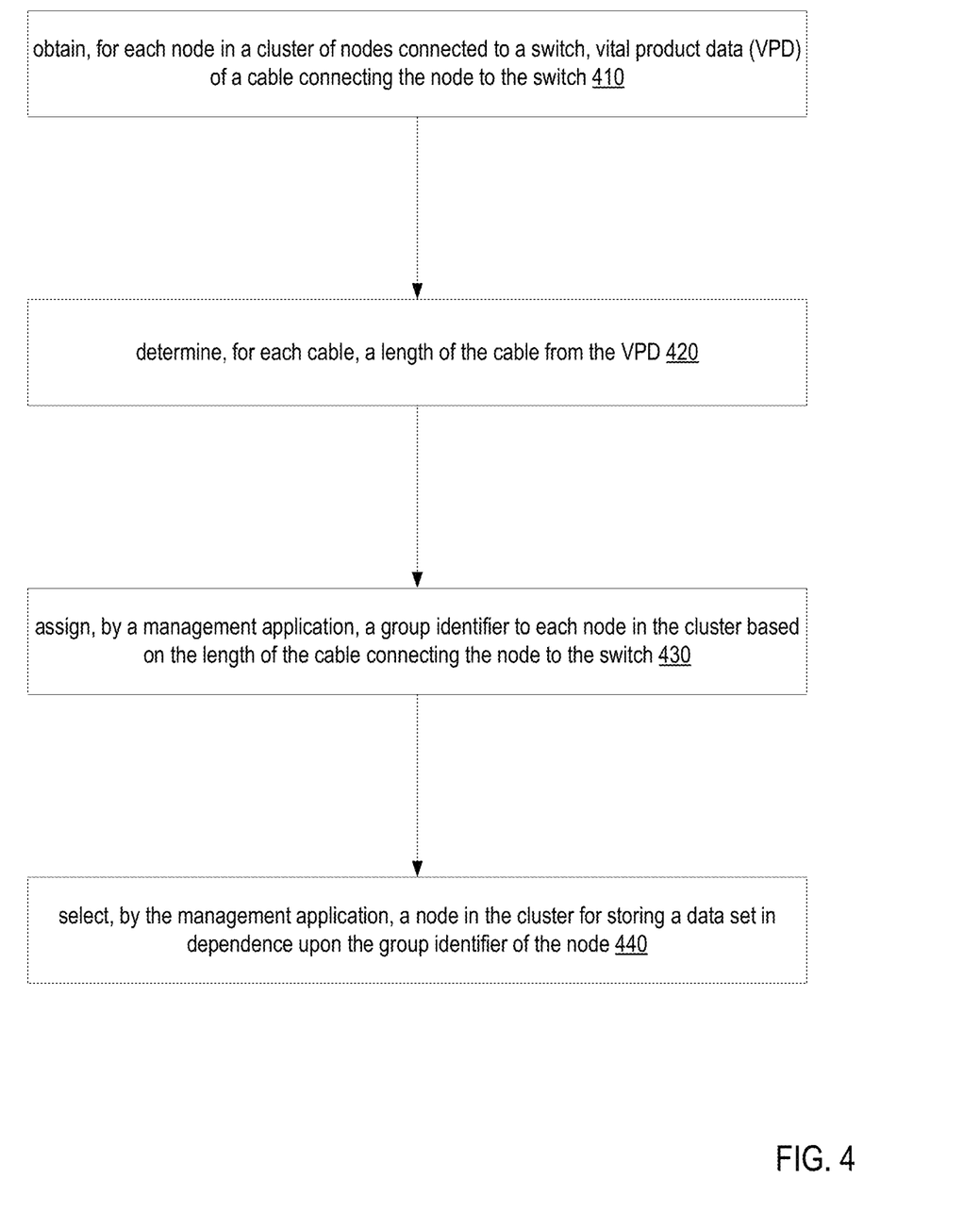
FIG. 4 sets forth a flow chart illustrating an exemplary method for estimating physical disparity for data locality in software-defined infrastructures according to embodiments of the present invention.

For further explanation, FIG. 4 sets forth a flow chart illustrating an exemplary method for estimating physical disparity for data locality in software-defined infrastructures according to embodiments of the present invention that includes obtaining (410), for each node in a cluster of nodes connected to a switch, vital product data (VPD) of a cable connecting the node to the switch. Obtaining (410), for each node in a cluster of nodes connected to a switch, VPD of a cable connecting the node to the switch may be carried out by the node OS (214) or the switch (103) retrieving the VPD embodied on the cable. For example, the VPD may be stored in a non-volatile memory of a connector of the cable such as fiber optic transceiver. When the cable is connected to the node (111) and/or the switch (103), the node (111) and/or the switch (103) may read the VPD from the cable connector over predetermined data line and report some or all of the VPD to the infrastructure management application (126).

The method of FIG. 4 also includes determining (420), for each cable, a length of the cable from the VPD. Determining (420), for each cable, the length of the cable from the VPD may be carried out by the node OS (214) or the infrastructure management application (126) parsing the VPD do determine the length of the cable connecting the node (111) to the switch (103). For example, the VPD may indicate that the cable is a 1 m, 3 m, or 5 m cable. The VPD may also contain information such as a manufacturer, model identifier, serial number, type of cable or other information that may be used to identify the cable. Thus, determining (420), for each cable, the length of the cable from the VPD may also be carried out by the node OS (214) or the infrastructure management application (126) using information such as the manufacturer, model identifier, serial number to identify a length of the cable from a database. For example, a serial number for a particular cable may indicate that the cable is a 1 m, 3 m, or 5 m cable. In some embodiments, the cable length is determined by the node OS (214) parsing the VPD and reporting the length to the infrastructure management application. In some embodiments, the cable length is determined by infrastructure management application (126) parsing the VPD.

The method of FIG. 4 also includes assigning (430), by a management application, a group identifier to each node in the cluster based on the length of the cable connecting the node to the switch. Assigning (430), by the management application, the group identifier to each node in the cluster based on the length of the cable connecting the node to the switch may be carried out by the infrastructure management application (126) determining a group of nodes (111) based on a length characteristic of the cable connecting each node (111) to the switch (103) and assigning an identifier to the group of nodes. The length characteristic may be the length of the cable retrieved from the VPD for each cable. In some embodiments, assigning (430), by a management application, a group identifier to each node in the cluster based on the length of the cable connecting the node to the switch may be carried out by assigning the same group identifier to nodes (111) that are connected to the switch (103) by a common length of cable. For example, with reference to the example in FIG. 3, the infrastructure management application (126) determines that the nodes (311) make up a group (310) that are connected to the switch (303) by respective 1 m cables (341) and assigns each node (311) in the group (310) an identifier "groupA." Similarly, the infrastructure management application (126) determines that the nodes (321) make up a group (320) that are connected to the switch (303) by respective 3 m cables (343) and assigns each node (321) in the group (320) an identifier "groupB." Similarly, the infrastructure management application (126) determines that the nodes (331) make up a group (330) that are connected to the switch (303) by respective 5 m cables (345) and assigns each node (331) in the group (330) an identifier "groupC."

The method of FIG. 4 also includes selecting (440), by the management application, a node in the cluster for storing a data set in dependence upon the group identifier of the node. Selecting (440), by the management application, the node in the cluster for storing the data set in dependence upon the group identifier of the node may be carried out by the infrastructure management application (126) storing an original data set, one or more replica data sets, and metadata on a selection of nodes (111) that each have a different assigned group identifier. For example, with reference to the example in FIG. 3, the infrastructure management application (126) may select a node (311a) with a group identifier "groupA" for storing an original data set and metadata for the data set, select another node (321a) with a group identifier "groupB" for storing a replica of the data set, and select yet another node (331a) with a group identifier "groupC" for storing another replica of the data set and a replica of the metadata. The infrastructure management application (126) utilizes the different group identifiers (i.e., groupA, groupB, groupC) as an estimate of a physical disparity in the location of the nodes (311a, 321a, 331a), such that the risk of a single point of failure affecting all of the nodes (311a, 321a, 331a) storing the data set and replica data sets is reduced, such that, in the event of a failure in one node (311a) or group (310) of nodes, data availability for the data in the data set is maintained by accessing the replica data set on another active node (321a, 331a) in other groups (320, 330). A user application may define application requirements for data availability to the infrastructure management application (126). For example, a user application may define a redundancy scheme with a redundancy factor of 3, such that data availability is maintained with a failure in one or two nodes in different groups.

Figure 5:
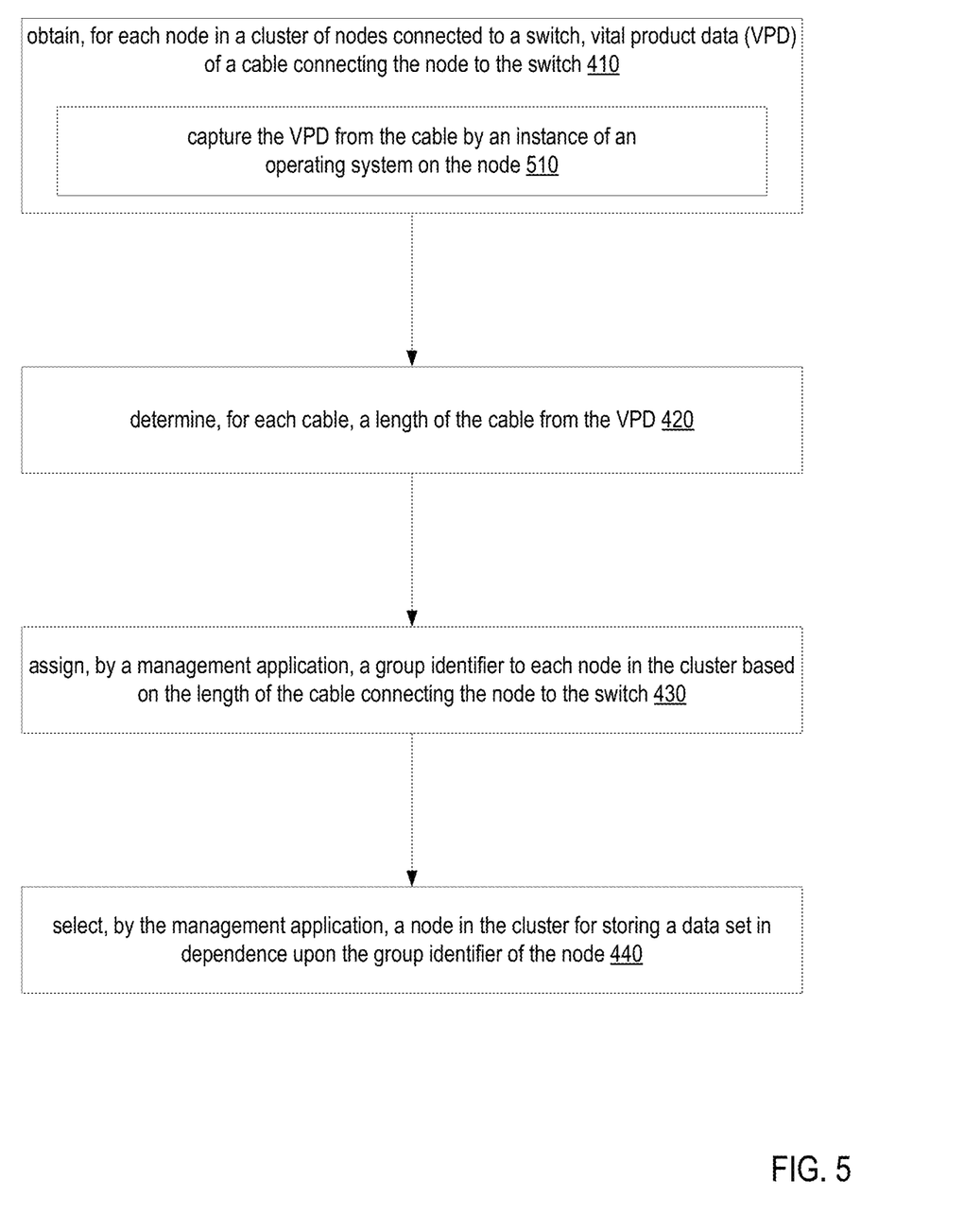
FIG. 5 sets forth a flow chart illustrating another exemplary method for estimating physical disparity for data locality in software-defined infrastructures according to embodiments of the present invention.

For further explanation, FIG. 5 sets forth a flow chart illustrating a further exemplary method for estimating physical disparity for data locality in software-defined infrastructures according to embodiments of the present invention. Like the method of FIG. 4, the exemplary method of FIG. 5 also includes obtaining (410), for each node in a cluster of nodes connected to a switch, VPD of a cable connecting the node to the switch, determining (420), for each cable, a length of the cable from the VPD, assigning (430), by a management application, a group identifier to each node in the cluster based on the length of the cable connecting the node to the switch, and selecting (440), by the management application, a node in the cluster for storing a data set in dependence upon the group identifier of the node.

The method of FIG. 5 differs from the method of FIG. 4 in that obtaining (410), for each node in a cluster of nodes connected to a switch, VPD of a cable connecting the node to the switch includes capturing (510) the VPD from the cable by an instance of an operating system on the node. Capturing (510) the VPD from the cable by an instance of an operating system on the node may be carried out by the node OS (214) reading VPD from a non-volatile memory of a transceiver/connector of the cable connected to the node (111). For example, the node OS (214) may read the VPD on a data line of the transceiver/connector of the cable connected to the node (111), parse the VPD to determine the cable length, and report the cable length to the infrastructure management application (126). As another example, the node OS (214) may read the VPD on a data line of the transceiver/connector of the cable connected to the node (111) and report the VPD to the infrastructure management application (126).

Figure 6:
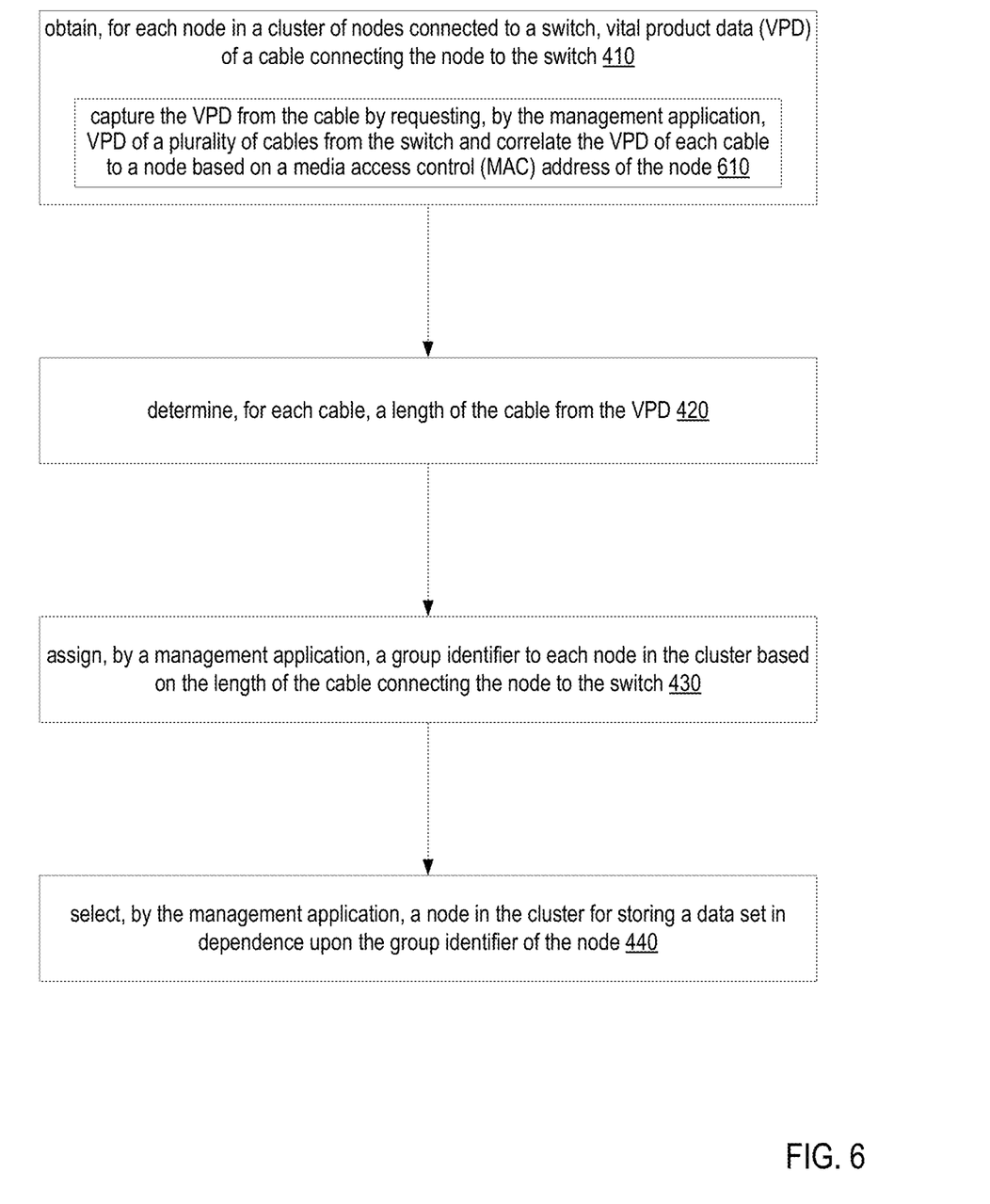
FIG. 6 sets forth a flow chart illustrating another exemplary method for estimating physical disparity for data locality in software-defined infrastructures according to embodiments of the present invention.

For further explanation, FIG. 6 sets forth a flow chart illustrating a further exemplary method for estimating physical disparity for data locality in software-defined infrastructures according to embodiments of the present invention. Like the method of FIG. 4, the exemplary method of FIG. 6 also includes obtaining (410), for each node in a cluster of nodes connected to a switch, VPD of a cable connecting the node to the switch, determining (420), for each cable, a length of the cable from the VPD, assigning (430), by a management application, a group identifier to each node in the cluster based on the length of the cable connecting the node to the switch, and selecting (440), by the management application, a node in the cluster for storing a data set in dependence upon the group identifier of the node.

The method of FIG. 6 differs from the method of FIG. 4 in that obtaining (410), for each node in a cluster of nodes connected to a switch, VPD of a cable connecting the node to the switch includes capturing (610) the VPD from the cable by requesting, by the management application, VPD of a plurality of cables from the switch and correlating the VPD of each cable to a node based on a media access control (MAC) address of the node. Capturing (610) the VPD from the cable by requesting, by the management application, VPD of a plurality of cables from the switch and correlating the VPD of each cable to a node based on a media access control (MAC) address of the node may be carried out by the infrastructure management application (126) requesting, from the switch (103), VPD for all of the cables connected to the switch (103) and the MAC addresses the devices connected to the ports corresponding to the VPD, correlating each MAC address and VPD corresponding to each port to a MAC address for each node (111), and determining that a particular VPD corresponds to a particular node (111) in the cluster (105).

Figure 7:
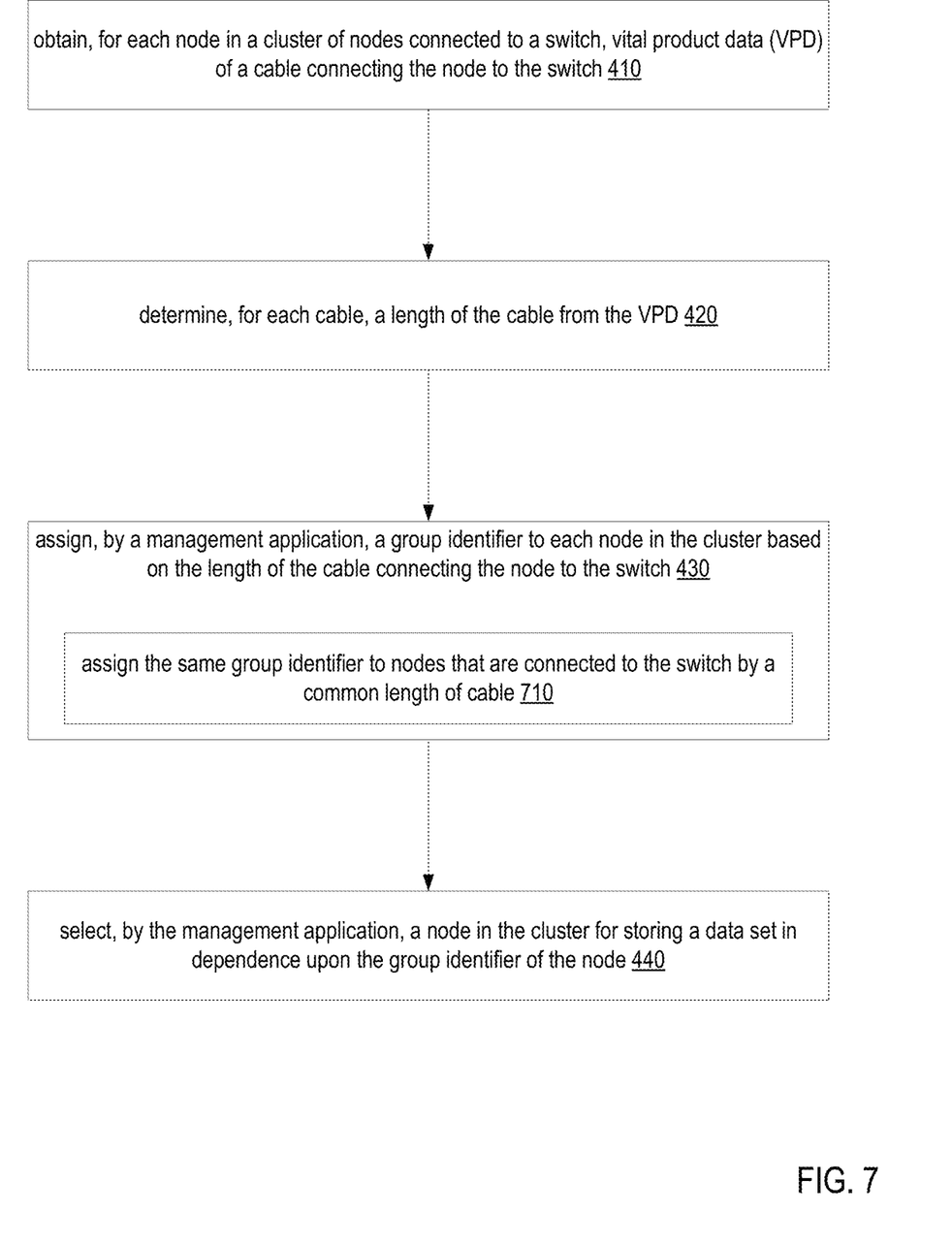
FIG. 7 sets forth a flow chart illustrating another exemplary method for estimating physical disparity for data locality in software-defined infrastructures according to embodiments of the present invention.

For further explanation, FIG. 7 sets forth a flow chart illustrating a further exemplary method for estimating physical disparity for data locality in software-defined infrastructures according to embodiments of the present invention. Like the method of FIG. 4, the exemplary method of FIG. 7 also includes obtaining (410), for each node in a cluster of nodes connected to a switch, VPD of a cable connecting the node to the switch, determining (420), for each cable, a length of the cable from the VPD, assigning (430), by a management application, a group identifier to each node in the cluster based on the length of the cable connecting the node to the switch, and selecting (440), by the management application, a node in the cluster for storing a data set in dependence upon the group identifier of the node.

The method of FIG. 7 differs from the method of FIG. 4 in that assigning (430), by a management application, a group identifier to each node in the cluster based on the length of the cable connecting the node to the switch includes assigning (710) the same group identifier to nodes that are connected to the switch by a common length of cable. Assigning (710) the same group identifier to nodes that are connected to the switch by a common length of cable may be carried out by the infrastructure management application (126) classifying all nodes (111) connected to the switch (103) by the same length of cable as belonging to the same group. For example, with reference to FIG. 3, the infrastructure management application (126) may determine that each node (321) is connected to the switch (303) by a 3 m cable, and thus belong to the same group (320); the infrastructure management application (126) may determine that each node (331) is connected to the switch (303) by a 5 m cable, and thus belong to the same group (330).

Figure 8:
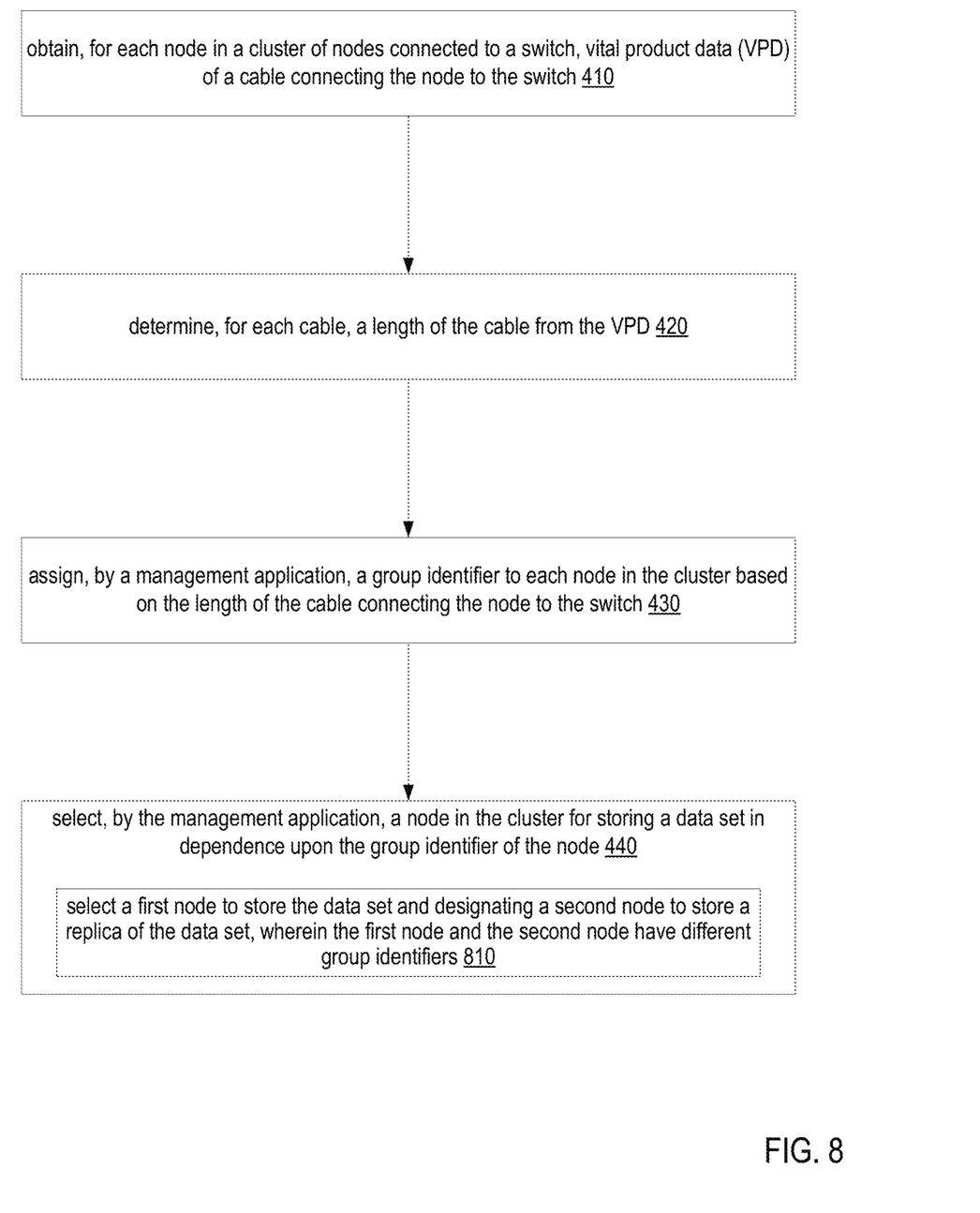
FIG. 8 sets forth a flow chart illustrating another exemplary method for estimating physical disparity for data locality in software-defined infrastructures according to embodiments of the present invention.

For further explanation, FIG. 8 sets forth a flow chart illustrating a further exemplary method for estimating physical disparity for data locality in software-defined infrastructures according to embodiments of the present invention. Like the method of FIG. 4, the exemplary method of FIG. 8 also includes obtaining (410), for each node in a cluster of nodes connected to a switch, VPD of a cable connecting the node to the switch, determining (420), for each cable, a length of the cable from the VPD, assigning (430), by a management application, a group identifier to each node in the cluster based on the length of the cable connecting the node to the switch, and selecting (440), by the management application, a node in the cluster for storing a data set in dependence upon the group identifier of the node.

The method of FIG. 8 differs from the method of FIG. 4 in that selecting (440), by the management application, a node in the cluster for storing a data set in dependence upon the group identifier of the node includes selecting (810) a first node to store the data set and designating a second node to store a replica of the data set, wherein the first node and the second node have different group identifiers. Selecting (810) a first node to store the data set and designating a second node to store a replica of the data set, wherein the first node and the second node have different group identifiers may be carried out by the infrastructure management application (126) identifying a first group of nodes (310) and a second group of nodes (330), selecting a node from each group (310, 330), and storing an original data set on the node in the first group (310) and a replica of the data set on the node in the second group (330). For example, the infrastructure management application (126) may receive requirements, defined by a user application, for a data redundancy scheme, and implement the data redundancy scheme by storing original data on one or more nodes in one group and replica data on one or more nodes in one or more other groups.

In view of the explanations set forth above, readers will recognize that the benefits of estimating physical disparity for data locality in software-defined infrastructures according to embodiments of the present invention include:
- improvements to a software-defined infrastructure through autonomous grouping of nodes based on an estimated relative physical location disparity among those nodes
- a high-availability for data stored in a cluster of nodes by mitigating the effect of a single point of failure
- increased data center performance and quality of service Exemplary embodiments of the present invention are described largely in the context of a fully functional computer system for estimating physical disparity for data locality in software-defined infrastructures. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of estimating physical disparity for data locality in software-defined infrastructures, the method comprising:
    obtaining, for each node in a plurality of nodes connected to a switch, vital product data (VPD) of a cable connecting the node to the switch;
    determining, for each cable, a length of the cable from the VPD;
    assigning, by a management application, a group identifier to each node in the plurality of nodes based on the length of the cable connecting the node to the switch; and
    selecting, by the management application, a node in the plurality of nodes for storing a data set in dependence upon the group identifier of the node.

2. The method of claim 1, wherein obtaining, for each node in the plurality of nodes connected to a switch, the VPD of the cable connecting the node to the switch includes capturing the VPD from the cable by an instance of an operating system on the node.

3. The method of claim 1, wherein obtaining, for each node in the plurality of nodes connected to a switch, VPD of a cable connecting the node to the switch includes capturing the VPD from the cable by requesting, by the management application, VPD of a plurality of cables from the switch and correlating the VPD of each cable to a node based on a media access control (MAC) address of the node.

4. The method of claim 1, determining, for each cable, the length of the cable from the VPD includes parsing the VPD to determine the length of the cable.

5. The method of claim 1, wherein assigning, by the management application, a group identifier to each node in the plurality of nodes based on the length of the cable connecting the node to the switch includes assigning the same group identifier to nodes that are connected to the switch by a common length of cable.

6. The method of claim 1, wherein selecting, by the management application, a node in the plurality of nodes for storing a data set in dependence upon the group identifier of the node includes selecting a first node to store the data set and designating a second node to store a replica of the data set, wherein the first node and the second node have different group identifiers.

7. The method of claim 1, wherein each cable is a direct attached cable (DAC) and the VPD is stored on a non-volatile memory in a transceiver of the DAC.

8. An apparatus for estimating physical disparity for data locality in software-defined infrastructures, the apparatus comprising a computer processor, a computer memory operatively coupled to the computer processor, the computer memory having disposed within it computer program instructions that, when executed by the computer processor, cause the apparatus to carry out the steps of:
    obtaining, for each node in a plurality of nodes connected to a switch, vital product data (VPD) of a cable connecting the node to the switch;
    determining, for each cable, a length of the cable from the VPD;
    assigning, by a management application, a group identifier to each node in the plurality of nodes based on the length of the cable connecting the node to the switch; and
    selecting, by the management application, a node in the plurality of nodes for storing a data set in dependence upon the group identifier of the node.

9. The apparatus of claim 8, wherein obtaining, for each node in the plurality of nodes connected to a switch, the VPD of the cable connecting the node to the switch includes capturing the VPD from the cable by an instance of an operating system on the node.

10. The apparatus of claim 8, wherein obtaining, for each node in the plurality of nodes connected to a switch, VPD of a cable connecting the node to the switch includes capturing the VPD from the cable by requesting, by the management application, VPD of a plurality of cables from the switch and correlating the VPD of each cable to a node based on a media access control (MAC) address of the node.

11. The apparatus of claim 8, determining, for each cable, the length of the cable from the VPD includes parsing the VPD to determine the length of the cable.

12. The apparatus of claim 8, wherein assigning, by the management application, a group identifier to each node in the plurality of nodes based on the length of the cable connecting the node to the switch includes assigning the same group identifier to nodes that are connected to the switch by a common length of cable.

13. The apparatus of claim 8, wherein selecting, by the management application, a node in the plurality of nodes for storing a data set in dependence upon the group identifier of the node includes selecting a first node to store the data set and designating a second node to store a replica of the data set, wherein the first node and the second node have different group identifiers.

14. The apparatus of claim 8, wherein each cable is a direct attached cable (DAC) and the VPD is stored on a non-volatile memory in a transceiver of the DAC.

15. A computer program product for estimating physical disparity for data locality in software-defined infrastructures, the computer program product disposed upon a computer readable medium, the computer program product comprising computer program instructions that, when executed, cause a computer to carry out the steps of:
   obtaining, for each node in a plurality of nodes connected to a switch, vital product data (VPD) of a cable connecting the node to the switch;
   determining, for each cable, a length of the cable from the VPD;
   assigning, by a management application, a group identifier to each node in the plurality of nodes based on the length of the cable connecting the node to the switch; and
   selecting, by the management application, a node in the plurality of nodes for storing a data set in dependence upon the group identifier of the node.

16. The computer program product of claim 15, wherein obtaining, for each node in the plurality of nodes connected to a switch, the VPD of the cable connecting the node to the switch includes capturing the VPD from the cable by an instance of an operating system on the node.

17. The computer program product of claim 15, wherein obtaining, for each node in the plurality of nodes connected to a switch, VPD of a cable connecting the node to the switch includes capturing the VPD from the cable by requesting, by the management application, VPD of a plurality of cables from the switch and correlating the VPD of each cable to a node based on a media access control (MAC) address of the node.

18. The computer program product of claim 15, determining, for each cable, the length of the cable from the VPD includes parsing the VPD to determine the length of the cable.

19. The computer program product of claim 15, wherein assigning, by the management application, a group identifier to each node in the plurality of nodes based on the length of the cable connecting the node to the switch includes assigning the same group identifier to nodes that are connected to the switch by a common length of cable.

20. The computer program product of claim 15, wherein selecting, by the management application, a node in the plurality of nodes for storing a data set in dependence upon the group identifier of the node includes selecting a first node to store the data set and designating a second node to store a replica of the data set, wherein the first node and the second node have different group identifiers.

* * * * *